United States Patent [19]

Chmielewski

[11] Patent Number: 6,147,158
[45] Date of Patent: Nov. 14, 2000

[54] COMPATIBILIZED BLENDS OF POLYKETONES AND POLYOLEFINS

[75] Inventor: Craig A. Chmielewski, Wixom, Mich.

[73] Assignee: Freudenberg-NOK General Parnership, Plymouth, Mich.

[21] Appl. No.: 09/489,786

[22] Filed: Jan. 24, 2000

Related U.S. Application Data

[60] Provisional application No. 60/142,470, Jul. 6, 1999.
[51] Int. Cl.$^7$ ................................................ C08L 77/00
[52] U.S. Cl. ............................................ 525/66; 525/179
[58] Field of Search ................................................ 525/66

[56] References Cited

U.S. PATENT DOCUMENTS 5,921,649  7/1999  Ash ............................................ 325/64
6,034,176  3/2000  Patel et al. ............................... 525/63

*Primary Examiner*—Ana Woodward
*Attorney, Agent, or Firm*—Dinnin & Dunn

[57] ABSTRACT

Blends of polyketone polymers with polyolefin polymers are described which are compatibilized by a reactive blend of a polyamide polymer and a maleated polyolefin polymer. The compatibilization is attained without chemical linkage between the compatibilizer and the polyketone polymer. Such compatibilized blends offer good mechanical properties and the ability to melt bond to both neat polyketone polymers and neat polyolefin polymers.

39 Claims, No Drawings

COMPATIBILIZED BLENDS OF POLYKETONES AND POLYOLEFINS

This application is a continuation in part of U.S. provisional application No. 60/142,470 filed Jul. 6, 1999.

BACKGROUND OF THE INVENTION

Polymer blending is of great commercial interest because it affords a low cost method of producing new materials. By blending materials with distinctly different properties, one has the potential of producing new materials exhibiting a combination of its component properties. Moreover, blending is usually done in relatively low cost polymer processing equipment. This is in opposition to the high costs associated with developing new materials based on new chemistries and polymerization processes.

Unfortunately most polymers are neither miscible nor compatible, and thus, simply blending polymers together often leads to materials with poor physical properties. Blending incompatible polymers results in materials with grossly course morphologies due to poor interfacial adhesion between its phases. This incompatibility is manifested in poor material properties, such as low strength, low modulus and delamination.

To resolve compatibility issues in polymer blends additional components (compatibilizers) are often added to the blends which act as interfacial agents between the phases. The most common class of polymer compatibilizers is the A-B type block copolymer where each component of the block is chemically identical to one of the two polymers comprising the polymer blend.

This invention describes a means of compatibilizing polyketone polymers with polyolefin polymers, using a method other than the A-B block copolymer described above. Well known in the art, polyketone polymers have excellent mechanical properties and fluid resistance and for this reason enjoy much commercial interest. Polyolefins have poorer fluid resistance than polyketones, yet are ubiquitous and very inexpensive. Therefore, it is natural that there is considerable interest in blending these two materials.

Simple uncompatibilized blends of polyketone polymers and polyolefin polymers, or polyketone polymers and chemically modified polyolefin polymers, are known in the art. Lutz in U.S. Pat. No. 4,816,514 describes obtaining improved processability by melt blending small amounts of polyolefin polymers with polyketone polymers. Likewise, Gergen et al. in U.S. Pat. No. H917 found improved processability from blends of polyketone polymers with maleated polyolefin polymers. Some improvements in properties, particularly barrier properties, are seen by the addition of amorphous olefinic copolymers, preferably those maleated, to polyketone polymers as described by George in U.S. Pat. No. H1,404. Bonner in U.S. Pat. No. 5,859,129 also found good barrier properties in blends of polyketone polymers with the polyolefin polymer: high-density polyethylene (HDPE), optionally grafted with at least one polymerisable ethylenically unsaturated carboxylic acid or derivative thereof. Bonner and Powell (U.S. Pat. No. 5,859,138) also found good barrier properties with blends of polyketone polymer and the polyolefin polymer: linear low-density polyethlene (LLDPE). George in U.S. Pat. No. H1, 375 recognized the problems of blending incompatible polymers such as polyketone polymers and polyolefin polymers. He was able to attain a desirable stiffness by blending cracked polyolefin polymers with polyketone polymers, discovering that by resorting to blends of cracked polyolefin polymers, he could make materials without phase separation.

A compatibilized blend system of a polyketone polymer and an aminated polyolefin polymer which chemically links to the polyketone polymer is described by Weinkauf in U.S. Pat. No. 5,369,170. The scope of Weinkauf's invention is to react diames with maleated polyolefin polymers to produce aminated (amine functional) polyolefin polymers which in turn can chemically graft to polyketone polymers, producing polylefin—polyketone graft copolymers.

SUMMARY OF THE INVENTION

The present invention provides compatibilized blends of linear alternating polyketone polymer of carbon monoxide and at least one ethylenically unsaturated hydrocarbon with a polyolefin polymer. The compatibilization is attained without chemical linkage between the polyolefin polymer and the polyketone polymer or between the compatibilizer and the polyketone polymer. The compatibilizer is comprised of a reactive blend of a maleated polyolefin, commonly produced from maleic acid modification of a polyolefin, and an amine terminated polyamide polymer. The preferred composition of the compatibilizer is such that its chemically modified polyolefin belongs to the same class of polyolefins as that used in the polyketone polymer blend. Preferably, the compatibilizer is produced prior to blending with the polyketone polymer and polyolefin, however, it may be made in situ, that is during the blending of the polyketone polymer and the polyolefin polymer.

DESCRIPTION OF PREFERRED EMBODIMENTS AND BEST MODE OF THE INVENTION

The preferred composition of the polymer blend of the present invention is as follows. The compatibilizer exists in the total composition of this invention as the minor component, ranging from 1 to 40 weight percent, but preferably in the range of 5 to 25 weight percent of the composition. The polyketone polymer can comprise between 15 and 85 weight percent of the total blend, but preferably between 30 and 70 weight percent of the composition. The unmodified polyolefin polymer can comprise between 15 and 85 weight percent of the total blend, but preferably between 30 and 70 weight percent of the composition.

For the purposes of this invention, polyketone polymers are defined as linear polymers having an alternating structure of (a) units derived from carbon monozide and (b) units derived from one or more olefinically unsaturated compounds. Although for the purposes of this patent polyketone polymers correspond to this idealized structure, it is envisaged that materials corresponding to this structure in the main, but containing small regimes of the corresponding homopolymer or copolymer derived from the olefinically unsaturated compound, also fall within the definition.

Suitable olefins for this invention are any of those made from the addition polymerization of one or more alpha olefins polymerized together. Thus, suitable polyolefin precursors of the compatibilizer component include polymers of ethylene, propylene, any of the isomeric butenes, e.g., 1-butene 2-butene or isobutylene, or mixtures thereof. Preferred polyolefin polymers are, but not limited to, polyethylene, polypropylene and polybutene, or copolymers of propylene or butylene with up to 40 weight percent ethylene. Also suitable are copolymers of ethylene with alpha olefins such as propene, 1-butene, 1-hexene and 1-octene. Particularly preferred polyolefin polymers are the polyethylene copolymers and polypropylene. Such polyolefin polymers are all well known in the art as are production methods of such polyolefin polymers.

The compatibilizer is produced from the reaction of the maleated polyolefin with an amine terminated polyamide and is well known in the art. The chemical reaction proceeds in the melt state and, at high temperatures, will yield a block or graft copolymer with a stable imide chemical group providing the linkage.

The maleated polyolefin polymer used is a polymer adduct of a polyolefin polymer and a maleic acid compound. These adducts, on occasion, are also referred to as alkenyl succinic anhydrides where the maleic acid compound is maleic anhydride. Although a variety of polyolefins, when maleated, are useful in producing the compatibilizer of this invention, the preferred maleated polyolefin polymers are those hydrocarbon polyolefins wherein the olefin has up to four carbon atoms inclusive. Thus, suitable polyolefin precursors of the compatibilizer component include polymers of ethylene, propylene, any of the isomeric butenes, e.g., 1-butene, 2-butene or isobutylene, or mixtures thereof. Preferred polyolefin polymers are, but not limited to, polyethylene, polypropylene and polybutene, or copolymers of propylene or butylene with up to 40 weight percent ethylene. Also suitable are copolymers of ethylene with alpha olefins such as propene, 1-butene, 1-hexene and 1-ocetene. Particularly preferred polyolefin polymers are the polyethylene copolymers and polypropylene. Such polyolefin polymers are all well known in the art as are methods of production of such polyolefin polymers.

Examples of commercially available maleic acid modified polyolefins include, but are not limited to, maleic acid modified polyethylene, maleic acid modified ethylene copolymers with alpha olefins of propylene, butene, hexene and octene and maleic acide modified polypropylene. Grafting levels of anhydride are less than ten percent and typically less then 5 percent. Common commercial examples of maleated polyolefin polymers are marketed under the tradename Polybond® by Uniroyal Chemical or Fusabond® by DuPont.

The polyamide polymer usable herein as a component of the compatibilizer is well known in the art and embraces those amorphous, semi-crystalline or crystalline compositions, having a molecular weight of at least 5000 and which are commonly referred to and defined herein as a nylon material. Examples of preferred polyamide polymers useable herein include nylon 6, polyhexamethylene adipamide (nylon 6,6), polyhexamethylene sebacamide (nylon 6,10), nylon 11, nylon 12 and polyhexamethylene dodecanoamide (nylon 6,12). The polyamides produced by ring opening of lactams, i.e. polycaprolactam, polylauric lactam, poly 11-aminoundecanoic acid, bis (paraaminocyclohexyl) methane dodecanoamide, are contemplated as usable herein. It is possible, to use in this invention, polyamides prepared by the copolymerization of two of the above polymers or terpolymerization of the above polymers or their components, e.g., an adipic isophthalic acid hexamethylene diamine copolymer. Polyamides usable include ones which are linear with a melting point in excess of 150° C.

The compatibilized polymer blend exhibits excellent mechanical properties with a good balance of chemical resistance and barrier properties. In addition the blend is melt bondable to both neat polyketone polymer and neat polyolefin polymer.

The blends of polyketone polymer, polyolefin polymer and compatibilizer can be prepared using known techniques and equipment for batch or continuous blending. The blends, according to the present invention, may also contain additives conventionally used in such compositions such as, for example, antioxidants, stabilizers, fillers, fire resistant materials, mold release agents and other substances which are added to improve the processability of the blend components or to modify the properties of the blend. Such additives are incorporated by conventional methods prior to, together with, or subsequent to the blending of the components.

All data presented in the following examples were generated using standard ASTM test specimens methods. Tensile, flexural and notched Izod test specimens were injection molded using an ASTM family mold. The tensile strength test was obtained according to ASTM D638–98, the flexural modulus according to ASTM D790–98, the Izod impact according to ASTM D256–97 and the melt flow rate according to ASTM D1238–98. The melt flow test was performed at 240° C., using a 21.6 kg load.

Examples 1 through 6

Examples 1 through 6 illustrate the invention by demonstrating the effects of increased levels of compatibilization 1:1 blends of HDPE and polyketone. The HDPE used in the examples is Fortiflex K46-06-161 from Solvay Polymers and the polyketone is a general purpose grade, Carilon D26HM700, from Shell Chemicals. The compatibilizing agents are a maleated HDPE from Uniroyal Chemical, Polybound 3009, and an extrusion grade of polyamide-6 from BASF, Ultramid B4 natural.

The materials were melt blended in a Werner and Pfleiderer ZSK-30 twin screw extruder (TSE) by feeding a pellet blend of all components at the feed throat. The ZSK-30 was a two lobed, co-rotating, fully intermeshing TSE, having 30 mm diameter screw elements and a 33:1 L/D ratio. Screw speed was set at between 350 and 380 rpm, and melt temperatures ranged from 270 to 276° C.

The compositions and physical properties of the materials comprising the examples are given in Table 1, where Example 1 is the control, containing no compatibilizing agents. In Examples 2 through 6, the addition of the compatibilizing agent shows improvements in the physical properties over the uncompatibilized control of Example 1. The tensile strength shows a considerable increase, beginning at the lowest compatibilizer levels tested (Example 2). The materials exhibit better flexibility at the compatibilizer levels of Examples 3 through 6, and better impact resistance at the levels of Example 4 through 6. The reduction in melt flow index from the control (Example 1) with the addition of compatibilizer content seen in Examples 2 and 3 is a result of a change in the blends' morphology due to the presence of the compatibilizer. This occurs even though the compatibilizer has a lower viscosity than either of the blend components. At compatibilizer levels greater than those seen in Example 3, the effect is saturated and the melt flow increases due to the lower viscosity of the compatibilizer.

TABLE 1

|      | Example No's. |    |    |    |    |    |
|------|---|----|----|----|----|----|
|      | 1 | 2  | 3  | 4  | 5  | 6  |
| HDPE | 50 | 45 | 36 | 33 | 31 | 25 |

TABLE 1-continued

| | | Example No's. | | | | | |
|---|---|---|---|---|---|---|---|
| | | 1 | 2 | 3 | 4 | 5 | 6 |
| Polyketone | | 50 | 45 | 36 | 33 | 31 | 25 |
| maleated HDPE | | 0 | 5 | 14 | 17 | 19 | 25 |
| PA-6 | | 0 | 5 | 14 | 17 | 19 | 25 |
| Tensile | MPa | 28.9 | 37.6 | 37.3 | 38.5 | 36.5 | 35.9 |
| Flexural Strength | MPa | 1127 | 1177 | 1064 | 1045 | 972 | 938 |
| Notched Izod Impact | J/m | 244 | 244 | 220 | 349 | 253 | 320 |
| Melt Flow Index | dg/min | 78.6 | 58.1 | 20.6 | 37.3 | 38.9 | 39.8 |

EXAMPLES 7 AND 8

Examples 7 and 8 address adhesion of the invention to a polyketone without the use of adhesives. The adhesion testing was done by overmolding examples of the invention onto a plaque of polyketone using an injection press. Several plaques of the aliphatic polyketone Carilon D26HM700 from Shell Chemical were obtained as samples and machined to the dimensions of 3 inches by 2 inches by ⅛ inch. One at a time, the plaques were heated to about 80° C. for 30 minutes and then inserted into the mold of a 75 ton injection press. The mold was designed so that material could be overmolded ½ inch on either side of the plaque. After more than 48 hours, the overmolded test pieces were then pulled in tension on an Instron Mechanical testing machine and the breaking stresses calculated, averaged and recorded. Results of two test completed are shown in Table 2. Example 7 represents the test specimen of polyketone overmolded with the material of Example 3. Example 8 represents the test specimen of polyketone overmolded with the material of Example 4. In both cases, high breaking strength was measured, indicating good bonding. In addition, cohesive failure occurred in both cases.

TABLE 2

| | | Example No.'s | |
|---|---|---|---|
| | | 7 | 8 |
| Breaking Stress | psi | 172 | 164 |

EXAMPLE 9

Example 9 addresses the adhesion of the materials of this invention to HDPE. An ASTM tensile bar comprised of the material of Example 4 was heated welded for several minutes at 254° C. to HDPE from Solvay Polymers, Fortiflex K46-06-161. After 24 hours the test piece was pulled under tension in an Instron Mechanical testing machine and the breaking stresses calculated. Table 3 shows that the breaking stress is that of the tensile strength of the material in Example 4 because of the failure occurred in the material of the invention and not at the weld joint, indicating excellent adhesion.

TABLE 3

| | | Example No. 9 |
|---|---|---|
| Breaking Stress | psi | 5880 |

The blends of the present invention can be fabricated into articles, containers, films or other applications using polymer processing equipment standard in the art, such as, but not limited to, extruders, coextruders, multilayer extruders, injection molders and blow molders. The blends of the present invention are particularly suitable for melt bonding of articles comprised of neat polyketone polymer and neat polyolefin polymer or as a so called tie layer, bonding polyketone polymer and polyolefin polymer films together.

While it will be apparent that the preferred embodiments of the invention disclosed are well calculated to fulfill the objects, and/or advantages of the invention, it will be appreciated that the invention is susceptible to modification, variation and change without departing from the proper scope or fair meaning of the subjoined claims.

What is claimed is:

1. A composition comprising a non-miscible blend of a polyketone polymer, a polyolefin polymer and, as a minor component, a compatibilizer, itself comprised of a reactive blend of an amine terminated polyamide polymer and a maleated polyolefin polymer.

2. A composition as in claim 1, where the polyketone polymer is comprised of an alternating structure of (a) units prepared from carbon monoxide and (b) units prepared from one or more olefinically unsaturated compounds.

3. A composition as in claim 2, where the polyketone polymer is an ethylene/propylene/CO terpolymer.

4. A composition as in claim 1, where the polyketone polymer is present in a quantity from about 15 to 85 weight percent, based on the total blend.

5. A composition as in claim 4, where the polyolefin is a high density polyethylene (HDPE).

6. A composition as in claim 5, where the HDPE has a density greater than 0.930 g/cc.

7. A composition as in claim 5, where the HDPE has a melt flow index greater than 0.1 g/10 min.

8. A composition as in claim 1, where the polyolefin polymer is selected from the group consisting of polyethylene, polypropylene, poly(1-butene) and poly(4-methyl-1-pentene).

9. A composition as in claim 1, where the polyolefin polymer is present in a quantity from about 15 to 85 weight percent, based on the total blend.

10. A composition as in claim 1, where the maleated polyolefin polymer is a maleic acid modification of a polyolefin polymer based on polymerization, copolymerization or terpolymerization of alpha olefins of ethylene, propylene, butene, hexene or octene.

11. A composition as in claim 1, where the maleated polyolefin polymer is a maleic acid modification of HDPE.

12. A composition as in claim 1, where the polyamide polymer has a molecular weight of at least 5000 and an amine termination.

13. A composition as in claim 1, where the polyamide polymer is nylon 6.

14. A composition as in claim 1, where the polyamide polymer is nylon 6,6.

15. A composition as in claim 1, where the compatibilizer is prepared prior to the preparation of the blend.

16. A composition as in claim 1, where the compatibilizer is prepared in situ, that is during, the preparation of the blend.

17. A composition as in claim 1, where the compatibilizer is present in a quantity from about 1 to 40, weight percent, based on the total blend.

18. An article of manufacture made from the composition of claim 1.

19. A composition comprising a non-miscible blend of a polyketone polymer, a polyolefin polymer and, as a minor component, a compatibilizer, itself comprised of a reactive blend of an amine terminated polyamide polymer and a maleated polyolefin polymer, and where the polyketone polymer is comprised of an alternating structure of (a) units prepared from carbon monoxide and (b) units prepared from one or more olefinically unsaturated compounds, and where the polyketone polymer is present in a quantity from about 15 to 85 weight percent, based on the total compositions, and where the polyolefin polymer is present in a quantity from about 15 to 85 weight percent, based on the total composition.

20. A composition as in claim 19, where the polyketone polymer is an ethylene/propylene/CO terpolymer.

21. A composition as in claim 19, where the polyolefin polymer is selected from the group consisting of polyethylene, polypropylene, poly(1-butene) and poly(4-methyl-1-pentene).

22. An article of manufacture made from the composition of claim 21.

23. A composition as in claim 19, where the polyolefin is a high density polyethylene (HDPE).

24. A composition as in claim 23, where the HDPE has a density greater than 0.930 g/cc.

25. A composition as in claim 24, where the HDPE has a melt flow index greater than 0.1 g/10 min.

26. An article of manufacture made from the composition of claim 24.

27. A composition as in claim 19, where the compatibilizer is comprised of a reactive blend of a maleated polylefin polymer and an amine terminated polyamide polymer.

28. A composition as in claim 27, where the maleated polyolefin polymer is a maleic acid modification of a polyolefin polymer based on polymerization, copolymerizatoin or terpolymerization of alpha olefins of ethylene, propylene, butene, hexene or octene.

29. A composition as in claim 28, where the maleated polyolefin polymer is a maleic acid modification of HDPE.

30. A composition as in claim 29, where the polyamide polymer has a molecular weight of at least 5000 and an amine termination.

31. A composition as in claim 30, where the polyamide polymer is a nylon material.

32. A composition as in claim 31, where the compatibilizer is prepared in situ, that is during, the preparation of the blend.

33. A composition as in claim 27, where the polyamide polymer is nylon 6.6.

34. An article of manufacture made from the composition of claim 29.

35. An article of manufacture made from the composition of claim 30.

36. An article of manufacture made from the composition of claim 31.

37. A composition as in claim 27, where the compatibilizer is prepared prior to the preparation of the blend.

38. An article of manufacture made from the composition of claim 27.

39. An article of manufacture made from the composition of claim 19.

* * * * *